(12) United States Patent
Partridge

(10) Patent No.: US 11,234,554 B2
(45) Date of Patent: Feb. 1, 2022

(54) TOOL FOR REMOVING COMPACTED PARTICLE RESIDUE FROM A CYLINDRICAL CONTAINER

(71) Applicant: Joseph James Partridge, Coslchester (GB)

(72) Inventor: Joseph James Partridge, Coslchester (GB)

( * ) Notice: Subject to any disclaimer, the term of this patent is extended or adjusted under 35 U.S.C. 154(b) by 293 days.

(21) Appl. No.: 16/475,466

(22) PCT Filed: Dec. 13, 2017

(86) PCT No.: PCT/GB2017/000179
§ 371 (c)(1),
(2) Date: Jul. 2, 2019

(87) PCT Pub. No.: WO2018/127676
PCT Pub. Date: Jul. 12, 2018

(65) Prior Publication Data
US 2020/0196794 A1    Jun. 25, 2020

(30) Foreign Application Priority Data
Jan. 4, 2017 (GB) ...................... 1700077

(51) Int. Cl.
*A47J 31/60* (2006.01)
*A47J 43/28* (2006.01)
*B08B 9/08* (2006.01)
*B08B 9/087* (2006.01)
*A47L 17/06* (2006.01)

(52) U.S. Cl.
CPC ............... *A47J 31/60* (2013.01); *A47J 43/28* (2013.01); *A47J 43/288* (2013.01); *A47L 17/06* (2013.01); *B08B 9/087* (2013.01); *B08B 9/0808* (2013.01)

(58) Field of Classification Search
CPC ......... B08B 9/0808; B08B 9/087; B08B 9/38; A47J 31/60; A47J 31/605; A47J 43/00;
(Continued)

(56) References Cited

U.S. PATENT DOCUMENTS 944,091 A * 12/1909 Harn ............................... 30/142
1,362,031 A * 12/1920 Nopp .................... A47J 43/288
30/136
(Continued)

FOREIGN PATENT DOCUMENTS

CA    2688054    *    6/2011

OTHER PUBLICATIONS

International Search Report for International Patent Application No. PCT/GB2017/000179 dated March 9, 2018, 3 pages.

*Primary Examiner* — Mark Spisich
(74) *Attorney, Agent, or Firm* — Klintworth & Rozenblat IP LLP

(57) ABSTRACT

A tool for removing particle residue from a cylindrical container includes a handle, configured to be grasped in the hand of a user to position the tool and to rotate the tool around an axis of rotation aligned substantially parallel to the handle, and at least one blade section extending from the handle at an angle to the axis of rotation. A user manipulates the handle in use to cause the tool to rotate about the axis of rotation so that the leading edge of the blade section moves into and through compacted particle residue within the cylindrical container.

19 Claims, 2 Drawing Sheets

(58) Field of Classification Search
CPC ......... A47J 43/28; A47J 43/288; A47L 13/08; A47L 17/00; A47L 17/06; A47G 21/00; A47G 21/04
USPC ... 15/236.01, 236.05–236.1, 104.02, 104.03, 15/104.05, 104.09, 104.095, 104.096, 15/104.16
See application file for complete search history.

(56) References Cited

U.S. PATENT DOCUMENTS

| | | | | |
|---|---|---|---|---|
| 1,883,726 A | * | 10/1932 | Warren | ..................... B26B 3/00 30/169 |
| 2,608,706 A | * | 9/1952 | Wakefield | ............... A47G 21/00 15/236.09 |
| 2,981,403 A | | 4/1961 | Goodrich | |
| 4,627,128 A | * | 12/1986 | Shea | ......................... B08B 1/00 15/104.001 |
| 5,291,992 A | | 3/1994 | Olivetti | |
| 5,799,997 A | * | 9/1998 | Lehn | ..................... A47L 13/022 15/236.07 |
| 6,601,263 B1 | | 8/2003 | Lam | |
| 2009/0025231 A1 | * | 1/2009 | Salvino | ..................... B08B 9/08 30/169 |
| 2009/0314166 A1 | | 12/2009 | Galbis | |
| 2012/0151704 A1 | * | 6/2012 | White | .................... A47G 21/04 15/236.05 |
| 2013/0255001 A1 | | 10/2013 | Simons | |
| 2014/0165317 A1 | | 6/2014 | Diener | |

* cited by examiner

TOOL FOR REMOVING COMPACTED PARTICLE RESIDUE FROM A CYLINDRICAL CONTAINER

FIELD

The present invention relates to a tool for assisting with removing compacted particle residue from a cylindrical container. More particularly, the present invention relates to a tool for removing coffee grounds from a cafetière or a similar coffee-making device.

BACKGROUND

There are several different ways to prepare coffee. It is common for most individuals and businesses to use pre-roasted pre-ground coffee beans. There are common steps to most of the preparation methods. Firstly (after roasting and grinding) the ground coffee is mixed with hot water for a certain time so that the chemicals and oils from the ground beans infuse into the water (the coffee beverage is 'brewed'). The used remains of the grounds are then separated from the liquid coffee before it is ready to drink.

There are several ways of mixing and then separating the ground coffee and the water. One common method is to use a filter, usually cone-shaped, which is filled with ground coffee, with hot water then allowed to percolate through the ground coffee and filter. The filter retains the ground coffee particles, while allowing the liquid coffee to pass through into a container such as a jug or cup. The filter can then be removed and disposed of, along with the retained used grounds.

Another way of preparing coffee is to force water through compacted ground coffee under pressure, for example by using an espresso machine or a stovetop coffee-maker.

One other common way is to use a device known as a cafetière, cafetière a piston, French press, or coffee plunger. These devices have a cylindrical container body with an open top into which a perforated plunger is removably located. Ground coffee is placed in the container body, and mixed with hot water. After a short brewing interval, the perforated plunger is pushed down through the mix of ground coffee and hot water, pressing the grounds down towards the bottom of the container but allowing the infused liquid (the coffee) to pass through the perforations into the upper part of the container. Once the plunger has been fully depressed, the coffee can be poured out from the container for drinking.

One issue with using non-filter devices such as a cafetière is that of removing and disposing of the compacted solid mass of used wet grounds that is left at the bottom of the cylindrical container after preparation. The grounds become compacted during the plunging process, and this results in a hardened mass that is resistant to removal or being broken up. It can also be difficult to remove compacted grounds from the containers used in espresso machines and stovetop coffee makers for similar reasons.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a tool for assisting with removing compacted particle residue from a container which goes some way to overcoming the above-mentioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in an aspect the present invention may broadly be said to consist in a tool for removing compacted particle residue from a cylindrical container, comprising: a handle, configured to be grasped in the hand of a user to position the tool and to rotate the tool around an axis of rotation aligned substantially parallel to the handle; at least one blade section extending from the handle at an angle to the axis of rotation, a user manipulating the handle in use to cause the tool to rotate about the axis of rotation so that the leading edge of the blade section moves into and through compacted particle residue within the cylindrical container, the at least one blade section further comprising a wall extending along at least part of the trailing edge of the blade section to the rear of the blade section. The blade section and handle allow a user to cut into and scrape out compacted grounds or similar from a coffee maker or similar, and the wall assists with keeping the grounds in position for ease of removal.

In an embodiment, the at least one blade section comprises a broad body section. This assists with the removal of the grounds.

In an embodiment, the at least one blade section is substantially planar. This allows the grounds to be pulled out or otherwise removed easily.

In an embodiment, the at least one blade section extends both substantially perpendicularly to the axis of rotation and with at least the leading edge angled inwards. This assists with positioning and using the blade, so that this can cut into the compacted grounds.

In an embodiment, the blade is shaped so that the leading and trailing edges meet, the wall shaped to gradually decrease in height along the length of the tailing edge so as to merge with the blade section substantially where the trailing edge meets the leading edge. This assists a user in positioning the tool and allowing this to cut into the grounds or similar material.

In an embodiment, the at least one blade section is sized and configured so that at least a portion of the trailing edge substantially conforms with the curvature of the inner surface of the cylindrical container. This assists a user to clear a container with the minimum effort.

In an embodiment, the at least one blade section is sized and configured so that the majority of the trailing edge substantially conforms with the curvature of the inner surface of the cylindrical container. This assists a user to clear a container with the minimum effort.

In an embodiment, the handle and at least one blade section are configured so that the axis of rotation is substantially aligned with the central axis of the cylindrical container. This simplifies positioning and use of the tool.

In an embodiment, the at least one blade section comprises a pair of blade sections, on opposed sides of the handle. This assists a user to clear a container with the minimum effort, and simplifies positioning and use of the tool.

In an embodiment, the handle comprises an elongate shaft. This allows the tool to extend into taller containers or longer shafts or similar.

In an embodiment, the shaft comprises a thicker outer end configured to be grasped by a user. This allows the handle to be easily grasped and manipulated.

In an embodiment, the surface of the outer end is configured as a non-slip surface. This allows the handle to be easily grasped and manipulated.

In an embodiment, the shaft further comprises a hook aperture at or close to the outer end. This allows the tool to be hung for storage or similar.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description, which is given by way of example only and with reference to the accompanying drawings, which show an embodiment of the device by way of example, and in which.

DETAILED DESCRIPTION

Figure 1:
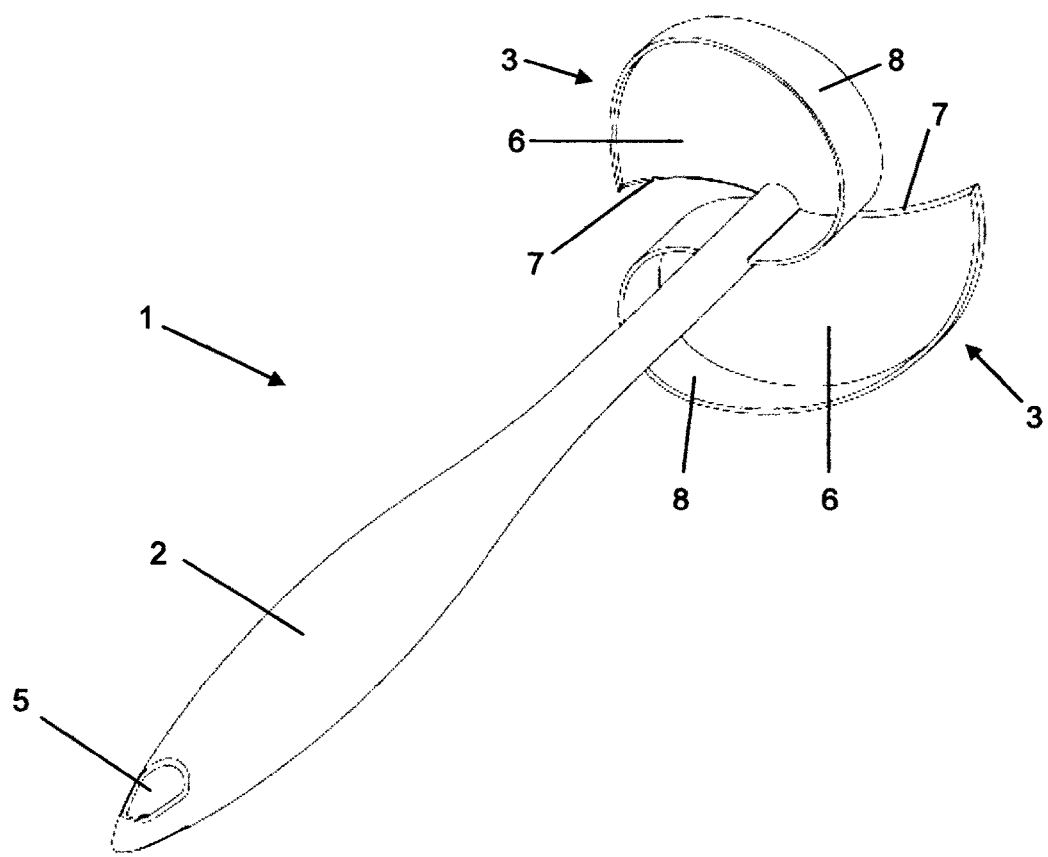
FIG. 1 shows a perspective view from above and to one side of an embodiment of the tool of the present invention, the tool having an elongate handle that forms an axis of rotation, and a pair of curved teardrop-shaped blade sections at the inner end, each shaped and angled so that rotation of the tool around the axis of the handle will cause the leading edges of the blade sections to move into and through the compacted particle residue, loosening this so that it can be removed, a wall extending rearwardly from the trailing edge of each of the blade sections to assist with retaining particle residue on the blade.

An embodiment of the tool of the present invention will now be described with reference to the figures.

The tool 1 has two main parts: a handle 2, and a pair of blade sections 3. The handle 2 comprises an elongate shaft that forms a central axis of rotation for the tool 1. The outer end of the handle 2 (furthest away from the blade sections 3) is thicker than the inner end, and is shaped to fit comfortably within the palm of a user's hand, so that they can manipulate, position and rotate the tool 1. The thicker portion is curved in profile and tapers at each end, to blend with the inner part of the handle at the inner end and to come to a point at the outer end. In this embodiment, the surface of the handle at the outer end is configured as a non-slip surface, for example by configuring this as a matte surface. Alternatively, the handle could have small protrusions or bumps moulded into/onto the surface to assist with grip. An aperture 5 passes through the outer end, which allows the tool 1 to be hung on a hook for storage or similar when not in use.

Figure 2:
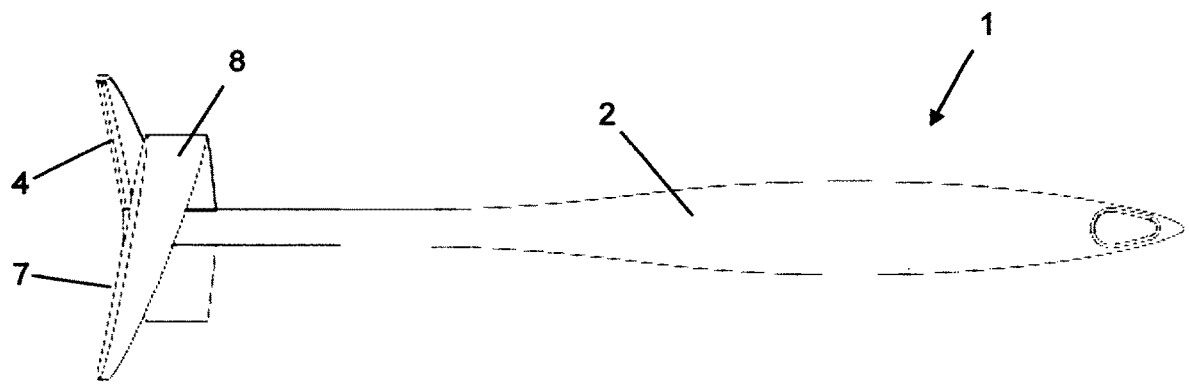
FIG. 2 shows a view from the side of the tool of FIG. 1, showing detail of the blade sections and their alignment in relation to the handle.
Figure 3:
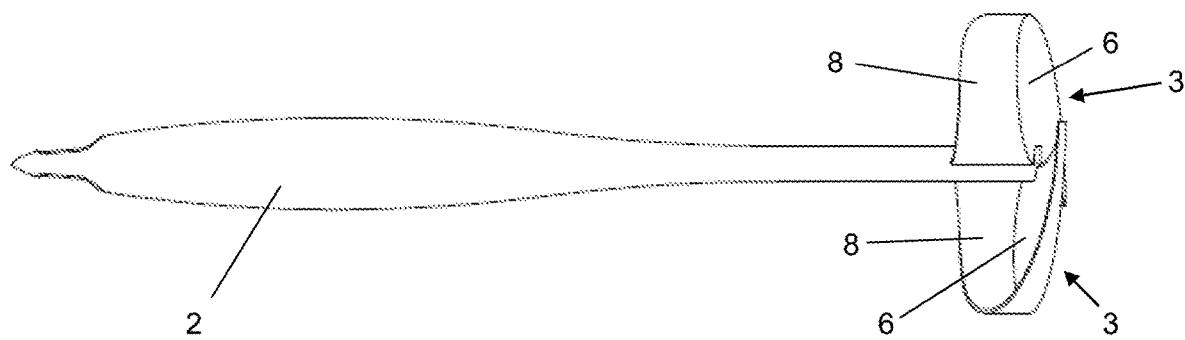
FIG. 3 shows a view from the side of the tool of FIGS. 1 and 2, rotated through 90 degrees.

Each of the pair of blade sections 3 is substantially identical to the other. Each comprises a substantially planar or flat broad body section 6 that extends from the shaft of the handle 2 at the inner end, substantially perpendicularly to the shaft. Each blade section has a leading edge 4. When viewed from the side with the axis of the handle horizontal, the planes of the blade sections 3 appear tilted at a small angle slightly forwards and rearwards, as can be seen in FIG. 2. The blade sections 3 are angled so that the leading edges 4 are angled inwards—that is, with the leading edge forwards or towards the inner end, furthest away from the handle.

Figure 4:
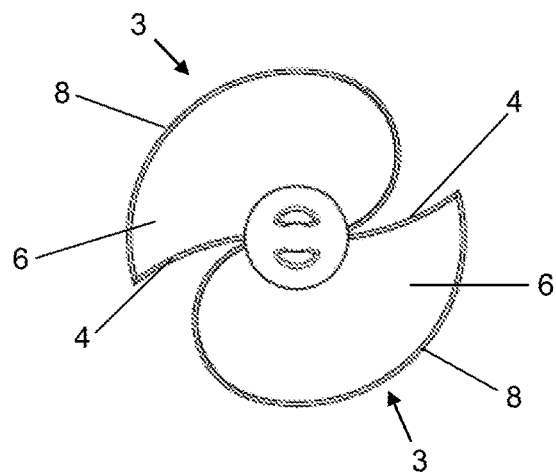
FIG. 4 shows a top view of the toot of FIGS. 1 to 3, looking towards the blade sections from the outer end of the handle.
Figure 5:
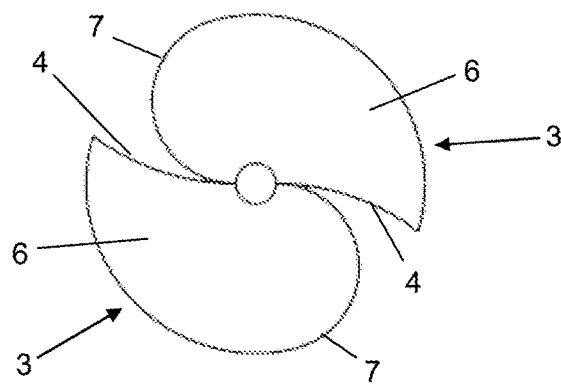
FIG. 5 shows a bottom view of the tool of FIGS. 1 to 4, looking upwards from the underside of the blade sections.

As shown best in FIGS. 4 and 5, each blade section 3 appears as a curved teardrop shape in plan view, or when viewed along the axis of the handle 2. The leading and trailing edges 4, 7 of the blade sections 3 meet at a point (the point of the teardrop) at the outermost extent of the blade sections, furthest from the axis of rotation. The blade sections 3 are sized and shaped so that the trailing edge 7 will fit against and conform to the curvature of the inner surface of the cylindrical container, along the majority of the length of the trailing edge 7.

A wall 8 extends along the length of the trailing edge 7, the wall extending outwards or towards the handle front the blade section, the wall 8 planar and with the plane of the wall 8 substantially parallel to the axis of rotation. The wall 8 is shaped to gradually decrease in height along the length of the trailing edge 7, decreasing in height from where the trailing edge meets the shaft, so as to merge with the plane of the blade section 3 substantially where the trailing edge 7 meets the leading edge 4.

The tool 1, and in particular the blade sections 3, are sized so that they can be used with standard sizes of container or cafetière. In this embodiment, the tool 1 is intended for use with standard sizes of cafetière. These come in standard sizes, and the tool 1 is sized to fit these as follows:

4 cup (small sized cafetière). Blade diameter 54 mm, handle height overall 29.5 mm.

8 cup (Espresso cups—the middle sized most popular version). Blade diameter 84 mm, handle height overall 29.5 mm.

12 cup (large sized cafetière). Blade diameter 96 mm, handle height overall 29.5 mm.

In use, a user pushes the tool 1 blades first into the cafetière, having emptied out all of the surplus liquid contents first. The axis of rotation of the tool 1 is substantially aligned with the central axis of the cylindrical container (the cafetière). A user then rotates the tool so that the leading edges lead with the blade sections 3 trailing the leading edges 4. The leading edges 4 move into and through the compacted particle residue within the cylindrical container, loosening this. A user cart then pull the handle outwards out of the cafetière to pull the grounds out and dispose of these. The wall 8 helps to retain the grounds on the blade sections 3 so that these don't drop off and cause a mess. As can be seen, the tool 1 will need to be rotated through roughly 180 degrees to fully clear a cafetière or similar in one turn The tool 1 in this embodiment is formed as a one piece item from a non-toxic thermoplastic polymer, or a similar non-toxic material that can be easily formed to the shape required, which can be easily cleaned post-use, and which is sufficient to endure hot water temperatures in use or when washed in a dishwasher.

The invention claimed is:

1. A tool for removing compacted particle residue from a cylindrical container, comprising:
   handle configured to be grasped in the hand of a user to position the tool and to rotate the tool around an axis of rotation aligned substantially parallel to the handle; and
   at least one blade section extending from the handle at an angle to the axis of rotation, the at least one blade section having body section defining a leading edge and a trailing edge and being shaped so that the leading and trailing edges meet, wherein a wall extending along at least part of the trailing edge of the at least one blade section gradually decreases in height along a length thereof,
   wherein a user manipulating the handle in use causes the tool to rotate about the axis of rotation so that the leading edge of the at least one blade section moves into and through compacted particle residue within the cylindrical container.

2. A tool as claimed in claim 1 wherein the body section of the at least one blade section is broad.

3. A tool as claimed in claim 2 wherein the body section is substantially planar.

4. A tool as claimed in claim 3 wherein the at least one blade section extends both substantially perpendicularly to the axis of rotation and with at least the leading edge angled inwards.

5. A tool as claimed in claim 4 wherein the at least one blade section is sized and configured so that the majority of the trailing edge substantially conforms with a curvature of the inner surface of the cylindrical container.

6. A tool as claimed in claim 3 wherein the at least one blade section comprises a pair of blade sections on opposed sides of the handle.

7. A tool as claimed in claim 6 wherein the handle and the at least one blade section are configured so that the axis of rotation is substantially aligned with a central axis of the cylindrical container.

8. A tool as claimed in claim 1 wherein the at least one blade section extends both substantially perpendicularly to the axis of rotation and with at least the leading edge angled inwards.

9. A tool as claimed in claim 1 wherein the at least one blade section is sized and configured so that at least a portion of the trailing edge substantially conforms with a curvature of the inner surface of the cylindrical container.

10. A tool as claimed in claim 1 wherein the at least one blade section is sized and configured so that the majority of the trailing edge substantially conforms with a curvature of the inner surface of the cylindrical container.

11. A tool as claimed in claim 1 wherein the handle and the at least one blade section are configured so that the axis of rotation is substantially aligned with a central axis of the cylindrical container.

12. A tool as claimed in claim 1 wherein the at least one blade section comprises a pair of blade on sections on opposed sides of the handle.

13. A tool as claimed in claim 12 wherein the handle and the pair of blade sections are configured so that the axis of rotation is substantially aligned with a central axis of the cylindrical container.

14. A tool as claimed in claim 12 wherein the wall of each blade section decreases in height from where the trailing edge meets the shaft so as to merge with a plane of the body section substantially where the trailing edge meets the leading edge.

15. A tool as claimed in claim 1 wherein the handle comprises an elongate shaft.

16. A tool as claimed in claim 15 wherein the shaft comprises a thicker outer end configured to be grasped by a user.

17. A tool as claimed in claim 16 wherein the outer end is has a surface configured as a non-slip surface.

18. A tool as claimed in claim 15 wherein the shaft further comprises a hook aperture at or close to the outer end.

19. A tool as claimed in claim 1 wherein the wall of the at least one blade section decreases in height from where the trailing edge meets the shaft so as to merge with a plane of the body section substantially where the trailing edge meets the leading edge.

* * * * *